United States Patent
Lim et al.

(10) Patent No.: US 8,770,331 B2
(45) Date of Patent: Jul. 8, 2014

(54) BATTERY PACK MOUNTING STRUCTURE OF VEHICLE

(75) Inventors: Hae Kyu Lim, Gyeonggi-do (KR); Yoon Cheol Jeon, Gyeonggi-do (KR); Yong Jin Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1 day.

(21) Appl. No.: 13/537,333

(22) Filed: Jun. 29, 2012

(65) Prior Publication Data

US 2013/0140101 A1 Jun. 6, 2013

(30) Foreign Application Priority Data

Dec. 1, 2011 (KR) .................. 10-2011-0127773

(51) Int. Cl.
*B60K 1/04* (2006.01)

(52) U.S. Cl.
CPC ....................... *B60K 1/04* (2013.01)
USPC ....................................... 180/68.5

(58) Field of Classification Search
CPC ....... B60K 1/04; B60K 11/06; H01M 2/1083; H01M 10/5004; H01M 10/5032; H01M 10/5067; H01M 10/5073; H01M 10/5016; Y02E 60/12
USPC ..................... 180/68.1, 68.2, 68.5
See application file for complete search history.

(56) References Cited

U.S. PATENT DOCUMENTS

| | | | | |
|---|---|---|---|---|
| 5,015,545 | A * | 5/1991 | Brooks | 429/99 |
| 5,490,572 | A * | 2/1996 | Tajiri et al. | 180/65.1 |
| 7,810,596 | B2 * | 10/2010 | Tsuchiya | 180/68.5 |
| 7,819,215 | B2 * | 10/2010 | Tsuchiya | 180/68.5 |
| 7,823,672 | B2 * | 11/2010 | Watanabe et al. | 180/68.5 |
| 7,900,728 | B2 * | 3/2011 | Suzuki et al. | 180/68.5 |
| 7,913,787 | B2 * | 3/2011 | Watanabe et al. | 180/68.5 |
| 8,251,169 | B2 * | 8/2012 | Fujiwara | 180/68.1 |
| 2008/0047767 | A1 * | 2/2008 | Tsuchiya | 180/68.5 |
| 2008/0164081 | A1 * | 7/2008 | Watanabe et al. | 180/65.2 |
| 2010/0089675 | A1 * | 4/2010 | Nagata et al. | 180/68.5 |
| 2010/0116568 | A1 * | 5/2010 | Kadoi | 180/65.1 |
| 2012/0118653 | A1 * | 5/2012 | Ogihara et al. | 180/65.8 |

FOREIGN PATENT DOCUMENTS

| JP | 2008-293853 A | 12/2008 |
|---|---|---|
| JP | 05-169981 B2 | 3/2013 |

* cited by examiner

*Primary Examiner* — J. Allen Shriver, II
*Assistant Examiner* — Brian Cassidy
(74) *Attorney, Agent, or Firm* — Edwards Wildman Palmer LLP; Peter F. Corless

(57) ABSTRACT

Disclosed is battery pack mounting structure for a high capacity battery in a vehicle. More specifically, a battery pack that includes a plurality of modules is mounted lengthwise in a center console installation space between a driver seat and a passenger seat. A cooling air providing means is configured to supply cooling air to a front protion of the battery pack, and a cooling air distributing means is configured to distribute the cooling air provided by the cooling air providing means to each of a plurality of battery modules individually. Finally, a discharge duct means is configured to receive cooling air that has already passed over each of the individual battery modules and discharge the cooling air through a rear portion of the battery pack to outside of a vehicle body.

5 Claims, 5 Drawing Sheets

BATTERY PACK MOUNTING STRUCTURE OF VEHICLE

CROSS-REFERENCE TO RELATED APPLICATION

This application claims under 35 U.S.C. §119(a) the benefit of Korean Patent Application No. 10-2011-0127773 filed on Dec. 1, 2011, the entire contents of which are incorporated herein by reference.

BACKGROUND (a) Technical Field

The present invention relates to a battery pack mounting structure of a vehicle, and more particularly, to a structure configured to mount a high voltage battery pack within a hybrid vehicle or an electric vehicle while providing a cooling structure thereof.

(b) Background Art

A high voltage battery pack capable of supplying a large amount of electricity is typically mounted in a hybrid vehicle or an electric vehicle. Since the volume of the battery pack is quite significant, providing an appropriate mounting space within a vehicle is one of the primary technological issues faced by vehicle manufactures. Further, since the weight of the battery pack is significant, ensuring workability within a mounting operation is also a concern.

Additionally, these battery packs emit heat during operation thereof and thus, they must be appropriately cooled in order to prevent failure and increase durability. These cooling operations exert a large influence the life-spans of all the battery packs in the system and therefore are essential in producing a quality product.

Matters described as the background art are just to improve the background of the present invention, but it should not be understood that the matters correspond to the related art which has been already known to those skilled in the art.

SUMMARY OF THE DISCLOSURE

The present invention has been made in an effort to provide a battery pack mounting structure of a vehicle configured to minimize modification of an existing vehicle structure and maximize spatial utilization within the vehicle by minimizing the use by the battery pack mounting structure of existing effective indoor space or a trunk compartment, provide excellent mounting workability of the battery pack, uniformly cool each of the battery cells constituting the battery pack, and prevent occupants from being exposed to an uncomfortable air flow environment by discharging air cooling a battery to the outside.

An exemplary embodiment of the present invention provides a battery pack mounting structure within a vehicle, including: a battery pack mounted lengthwise within a center console installation space between a driver seat and a passenger seat; a cooling air providing means configured to supply cooling air from a front of the battery pack; a cooling air distributing means configured to distribute the cooling air from the cooling air providing means to a plurality of battery modules constituting the battery pack; and a discharge duct installed to receive the cooling air after the cooling air has passed through the battery pack and discharge the cooling air through a rear of the battery pack to the outside of a vehicle body.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
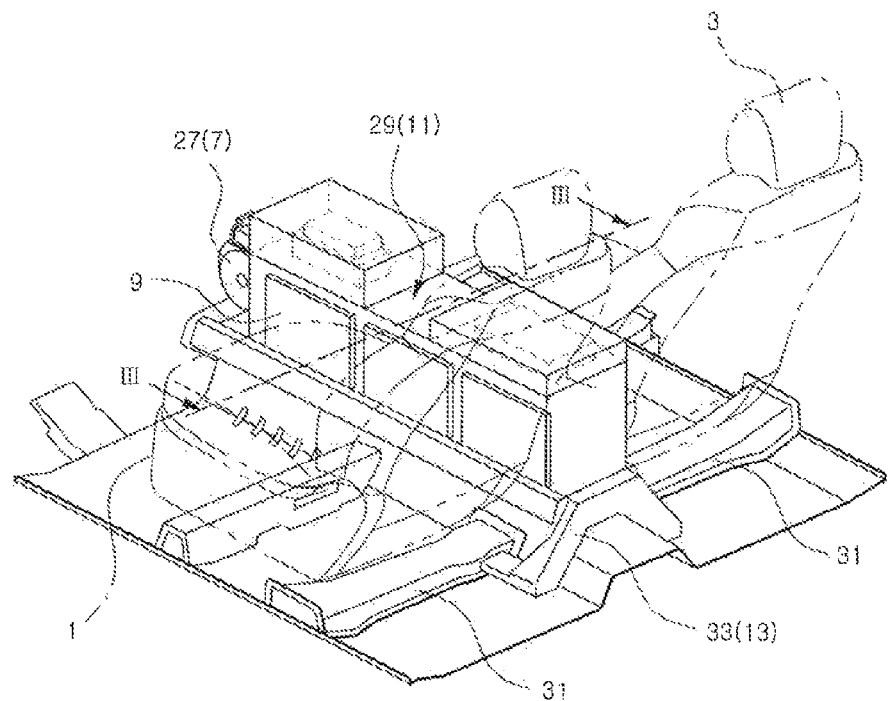
FIG. 1 is a perspective view showing a battery pack mounting structure of a vehicle according to an exemplary embodiment of the present invention.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION

First, it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Referring to FIGS. 1 to 8, a battery pack mounting structure of a vehicle according to an exemplary embodiment of the present invention includes a battery pack 5 mounted lengthwise in a center console installation space between a driver seat 1 and a passenger seat 3, a cooling air providing means 7 (e.g. a cooling fan 27) provided to supply cooling air to a front portion of the battery pack 5, a cooling air distributing means 11 (e.g., a plurality of branch ducts 29) distributing the cooling air from the cooling air providing means 7 to a plurality of battery modules 9 constituting the battery pack 5, and a discharge duct means 13 configured to receive cooling air that has already passed through one of the battery modules 9 and discharge the received cooling air through a rear portion of the battery pack mounting structure 19 mounting structure to the outside of a vehicle body. For instances, the cooling air may be discharged through a bottom rear portion of the battery pack mounting structure 19.

That is, the battery pack 5 is disposed in a space previously occupied by the center console, and as a result, a trunk compartment space of the vehicle can more efficiently be used and since the battery pack 5 does space which is traditionally utilized by consumers, spatial utilization of the vehicle may be maximized. Furthermore, the battery modules 9 may be installed without any change in the locations of the driver seat 1 and the passenger seat 3.

Figure 2:
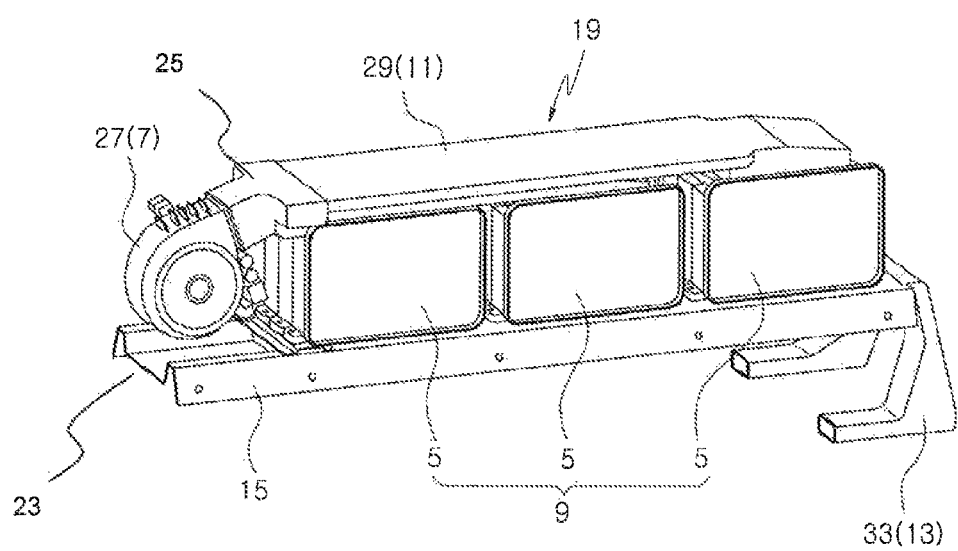
FIG. 2 is a diagram showing a state in which the battery pack, a cooling air providing means, and a cooling air distributing means of FIG. 1 are modularized on a mounting plate.
Figure 4:
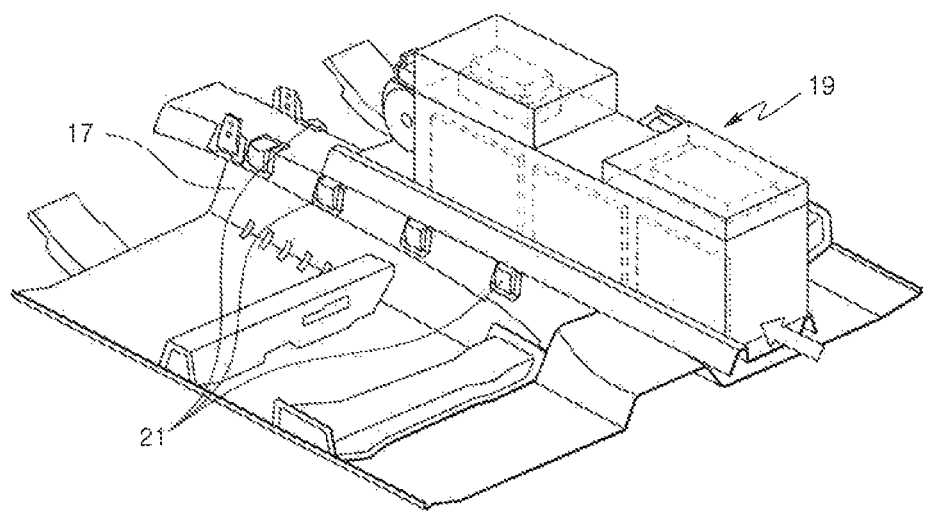
FIG. 4 is a diagram describing a state in which a battery pack module of FIG. 2 is mounted on a vehicle in a sliding manner.

In the exemplary embodiment, the battery pack 5, the cooling air providing means 7, and the cooling air distributing means 11 are integrally modularized and installed lengthwise on a mounting plate 15 which extends. The mounting plate 15 may be seated and fixed to the top of a center tunnel 17 of a floor panel. That is, when a battery pack mounting structure 19 modularized in the state shown in FIG. 2 is configured and mounted on the vehicle, the battery pack mounting structure 19 may be mounted on the vehicle in a sliding manner as shown in FIG. 4.

Furthermore, the battery pack mounting structure 19 may mounted by sliding the mounting plate 15 into fitted portions on top of the center tunnel 17. In order to slide the battery pack mounting structure 19 into the fettle portions, in the exemplary embodiment, the mounting plate 15 includes a plurality of curves. Both sides of the mounting plate are formed to receive a plurality of mounting brackets 21 attached to the center tunnel. The mounting brackets 21 are configured to fix the mounting plate on both sides of the mounting plate to the center tunnel 17.

Accordingly, the mounting plate 15 and the center tunnel 17 and the mounting bracket 21 have a rail-like structure therebetween, thus, when the battery pack mounting structure 19 slid across this structure, the battery pack mounting structure 19 moves linearly across the mounting brackets 21 into the proper position so that the battery pack mounting structure may be installed accurately.

As a result, when the battery pack mounting structure 19 is loaded into an exact position by the above method, the mounting plate 15 and the mounting bracket 21 are joined and fixed to each other with, e.g., a joining bolt, and as a result, a mounting operation of the battery pack mounting structure 19 is completed.

Figure 3:
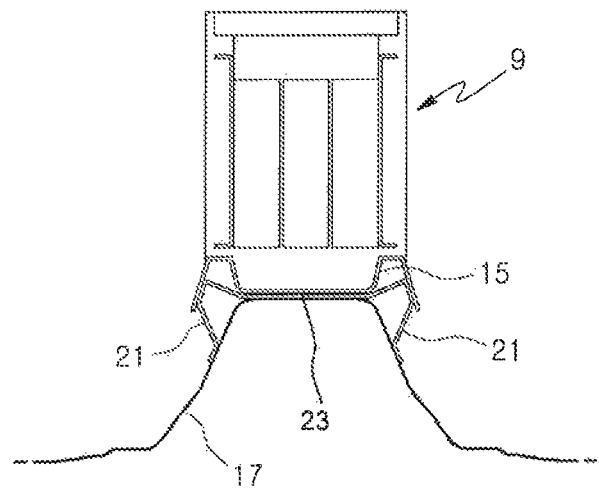
FIG. 3 which is a cross-sectional view taken along line III-III of FIG. 1, is a diagram showing a structure in which the mounting plate is fixed to the top of a center tunnel.

Meanwhile, when a sectional structure of the mounting plate 15 is configured to include a center protrusion 23 of which the center protrudes downward to form a horizontal plane, the center protrusion 23 of the floor panel is supported on the top of the center tunnel 17 as shown in FIG. 3 to ensure a more sturdy and stable mounting state.

In the exemplary embodiment, the cooling air providing means 7 may be embodied as cooling fan 27 that is installed on the mounting plate 15 in front of the battery pack 5 to provide air by rotational force thereof and blow the air into the cooling air distributing means 11 through an exhaust duct 25. In the illustrative embodiment of the present invention, the exhaust duct 25 is opened rearward on the top of the forward most battery pack 5.

Although the illustrative embodiment of the present invention illustrates the cooling air providing means 7 as a cooling fan, the present invention is not limited as so. For example, a blower within an air-conditioning device installed a different location within the vehicle may also satisfy the cooling air providing means 7.

Figure 5:
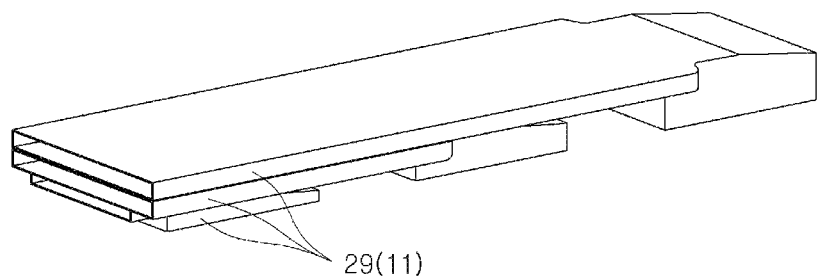
FIG. 5 is a diagram showing the cooling air distributing means of FIG. 2.
Figure 6:
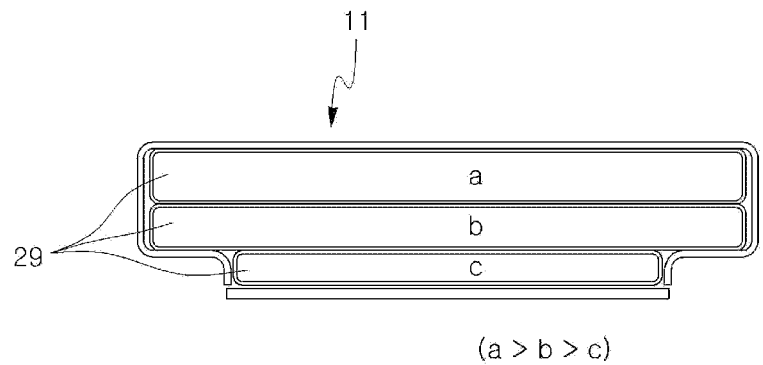
FIG. 6 is a cross-sectional view of portions of branch ducts of FIG. 5 coupled to an exhaust hole of a cooling fan.
Figure 7:
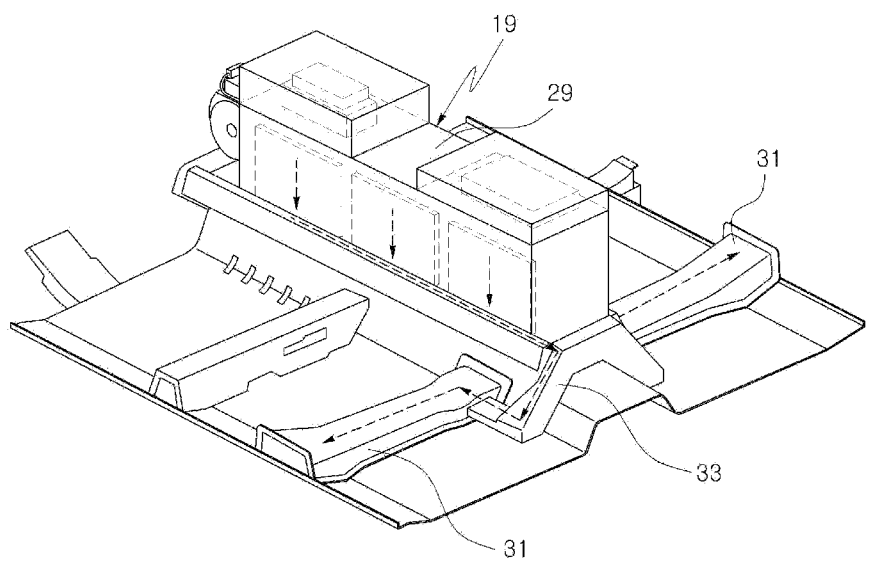
FIGS. 7 and 8 are diagrams illustrate a path through which cooling air flows from the cooling fan through the battery module and thereafter, discharged.
Figure 8:
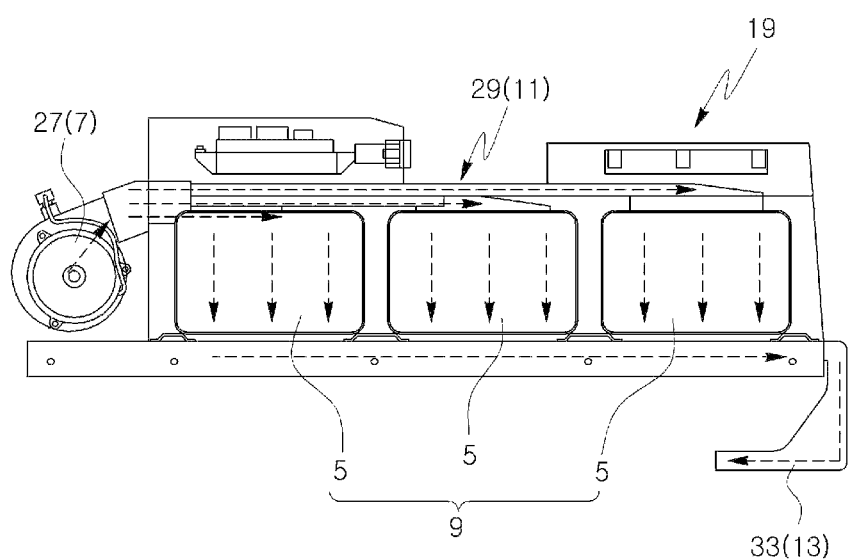

The battery pack mounting structure is configured to place each of the battery modules 9 lengthwise in series in the forward and backward directions of the vehicle and one end of the cooling air distributing means 11 is connected to the exhaust duct 25 of the cooling fan 27 and the other end is connected to each battery module 9 as shown in FIG. 2 or 5. The cooling air distributing means 11 may be configured as a plurality of branch ducts 29 which are overlapping to providing cooling air from the cooling fan 27 to each of the battery modules individually. These branch ducts may each have sectional areas in communication with the exhaust duct 25, which are relatively large.

Therefore, each of the battery modules 9 may receive the same amount of cooling air at similar temperatures almost simultaneously due to the individual delivery system of each individual duct for each individual battery module 9.

Furthermore, in the exemplary embodiment, the branch ducts 29 are formed in a shape of a plurality of hollow plates overlapped and are placed on the top of the battery pack 5 to achieve a compact configuration while minimizing a volume occupied by the branch ducts 29.

The discharge duct means 13 may be configured as an outlet duct 33 that is connected from a rear lower side of the battery pack 5, is branched to both sides of the center tunnel 17, and is in communication with a center floor reinforcing frame 31 installed on the floor panel of the vehicle in a horizontal direction of the vehicle body to discharge the cooling air to the outside of the vehicle body through a distal end outside opening up to of vehicle body of the center floor reinforcing frame 31. Accordingly, the occupants of the vehicle the air passed over the cooling battery do not affect the occupants of the vehicle.

Advantageously, the present invention minimizes modifications to an existing vehicle structure and maximizes spatial utilization of the vehicle by minimizing the amount of space required for mounting a batter pack in a hybrid or electric vehicle. The illustrative embodiment of the present invention also provides for efficient battery pack operation by uniformly cooling each of the battery modules individually, and while at the same time preventing occupants from feeling uncomfortable due to the cooling air being discharged into the interior cabin of the vehicle.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. A battery pack mounting structure of a vehicle, comprising:
   a battery pack mounted lengthwise in a center console installation space between a driver seat and a passenger seat and including a plurality of battery modules;
   a cooling air providing means configured to supply cooling air to a front portion of the battery pack;
   a cooling air distributing means configured to distribute the cooling air provided by the cooling air providing means to each of the plurality of battery modules individually; and
   a discharge duct means configured to receive cooling air that has already passed over each of the individual battery modules and discharge the cooling air through a rear portion of the battery pack to outside of a vehicle body,
   wherein:
   the battery pack, the cooling air providing means, and the cooling air distributing means are integrally modularized and installed on a mounting plate which extends lengthwise in the vehicle,
   the mounting plate is seated and fixed to a top portion of a center tunnel of a floor panel,
   the cooling air providing means is a cooling fan installed on the mounting plate in the front portion of the battery pack to provide air via rotational force thereof and blow the provided air into the cooling air distributing means through an exhaust duct, the exhaust duct is opened rearward on the top of the battery pack, the battery pack is configured by placing the plurality of battery modules in series in lengthwise direction of the vehicle, and one end of the cooling air distributing means is connected to the exhaust duct of the cooling fan and a plurality of other ends are each connected respectively to each of the battery modules individually to supply cooling air to each battery module individually from above, wherein the cooling air distributing means is embodied as a plurality of branch ducts which overlap each other longitudinally to provide cooling air from the cooling fan to each of the battery modules individually.

2. The battery pack mounting structure of a vehicle of claim 1, wherein:

the mounting plate includes a plurality of curves, wherein both sides are formed to receive a plurality of mounting brackets attached to the center tunnel of a floor panel, and the plurality of mounting brackets are configured to fix the mounting plate to the center tunnel in a particular position.

3. The battery pack mounting structure of a vehicle of claim 2, wherein a sectional structure of the mounting plate is configured to include a center protrusion protruding downward from a center of the mounting plate to form a horizontal plane.

4. The battery pack mounting structure of a vehicle of claim 1, wherein the branch ducts are formed in a shape of a plurality of hollow plates overlapped one on top of the other and placed on top of the battery pack.

5. The battery pack mounting structure of a vehicle of claim 1, wherein the discharge duct means is an outlet duct that is connected from a rear lower side of the battery pack, is branched to both sides of the center tunnel, and is in communication with a center floor reinforcing frame installed on the floor panel of the vehicle in a horizontal direction of the vehicle body to discharge the cooling air to the outside of the vehicle body through an exit opening outside the vehicle body.

* * * * *